(12) United States Patent
Feeser et al.

(10) Patent No.: US 11,522,839 B1
(45) Date of Patent: *Dec. 6, 2022

(54) REMOTE ACCESS SERVICE INSPECTOR

(71) Applicant: International Business Machines Corporation, Armonk, NY (US)

(72) Inventors: Colin Lee Feeser, Atlanta, GA (US); Anthony W. Ondrus, Kennesaw, GA (US); Steven J. Sanders, Sugar Hill, GA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/165,901

(22) Filed: Feb. 2, 2021

Related U.S. Application Data

(63) Continuation of application No. 16/412,395, filed on May 14, 2019, now Pat. No. 10,911,415, which is a
(Continued)

(51) Int. Cl.
*H04L 29/00* (2006.01)
*H04L 9/40* (2022.01)
(Continued)

(52) U.S. Cl.
CPC ........ *H04L 63/0428* (2013.01); *G06F 16/137* (2019.01); *H04L 12/4641* (2013.01);
(Continued)

(58) Field of Classification Search
CPC . H04L 63/0428; H04L 67/01; H04L 12/4641; H04L 63/0272; H04L 63/10;
(Continued)

(56) References Cited

U.S. PATENT DOCUMENTS 6,161,139 A * 12/2000 Win ............ H04L 63/105
726/8
6,493,751 B1 12/2002 Tate et al.
(Continued)

FOREIGN PATENT DOCUMENTS

JP 2001282643 A 10/2001
JP 2001282646 A 10/2001

OTHER PUBLICATIONS

The NPL references can be found in the parent application, U.S. Appl. No. 16/412,395.
(Continued)

*Primary Examiner* — Brandon Hoffman
*Assistant Examiner* — Michael D Anderson

(57) ABSTRACT

A method, system, and computer program product for providing protected remote access from a remote access client to a remote access server over a computer network through a plurality of inspections. A remote access configuration file is created for the remote access client. A digital hash of the configuration file is then generated. The digital hash is compared with a configuration file stored at a predefined web location. If the comparison results in a match between the digital hash and the stored configuration file, a digital hash comparison is performed between an encrypted remote access configuration file and an encrypted configuration file stored at the predefined web location. If the plurality of inspections are passed, the remote access client is released from a quarantine state and a virtual private network (VPN) connection to the remote access server is established.

20 Claims, 10 Drawing Sheets

Related U.S. Application Data continuation of application No. 15/621,402, filed on Jun. 13, 2017, now Pat. No. 10,291,593, which is a continuation of application No. 15/175,935, filed on Jun. 7, 2016, now Pat. No. 9,680,802, which is a continuation of application No. 14/501,403, filed on Sep. 30, 2014, now Pat. No. 9,369,444, which is a continuation of application No. 11/686,113, filed on Mar. 14, 2007, now Pat. No. 8,850,547.

(51) Int. Cl.
*G06F 16/13* (2019.01)
*H04L 67/00* (2022.01)
*H04L 67/04* (2022.01)
*H04L 67/08* (2022.01)
*H04L 12/46* (2006.01)
*H04L 67/01* (2022.01)

(52) U.S. Cl.
CPC .......... *H04L 63/0272* (2013.01); *H04L 63/10* (2013.01); *H04L 63/145* (2013.01); *H04L 63/1441* (2013.01); *H04L 63/20* (2013.01); *H04L 67/01* (2022.05); *H04L 67/04* (2013.01); *H04L 67/08* (2013.01); *H04L 67/34* (2013.01)

(58) Field of Classification Search
CPC ... H04L 63/1441; H04L 63/145; H04L 63/20; H04L 67/04; H04L 67/34; G06F 16/137
USPC ........................................................ 713/168
See application file for complete search history.

(56) References Cited

U.S. PATENT DOCUMENTS

| | | | |
|---|---|---|---|
| 6,662,221 B1 | 12/2003 | Gonda et al. | |
| 6,701,440 B1 | 3/2004 | Kim et al. | |
| 6,715,075 B1 | 3/2004 | Loukianov | |
| 6,873,988 B2 | 3/2005 | Herrmann et al. | |
| 6,892,225 B1 | 5/2005 | Tu et al. | |
| 6,971,005 B1 | 11/2005 | Henry et al. | |
| 7,360,237 B2 | 4/2008 | Engle et al. | |
| 7,673,332 B2 | 3/2010 | Mardikar et al. | |
| 8,359,464 B2 | 1/2013 | Shimada | |
| 2002/0004832 A1* | 1/2002 | Yoon | H04L 63/0807 709/229 |
| 2002/0010800 A1 | 1/2002 | Riley et al. | |
| 2002/0066093 A1* | 5/2002 | Yen | G06F 8/656 717/169 |
| 2002/0082006 A1 | 6/2002 | Narvanen et al. | |
| 2002/0144144 A1 | 10/2002 | Weiss et al. | |
| 2002/0199115 A1 | 12/2002 | Peterson et al. | |
| 2003/0018916 A1 | 1/2003 | Smith et al. | |
| 2003/0163577 A1 | 8/2003 | Moon et al. | |
| 2003/0204632 A1 | 10/2003 | Willebeek-LeMair et al. | |
| 2003/0208695 A1 | 11/2003 | Soto et al. | |
| 2003/0236865 A1 | 12/2003 | Anthe et al. | |
| 2004/0187018 A1 | 9/2004 | Owen et al. | |
| 2005/0021978 A1 | 1/2005 | Bhat et al. | |
| 2005/0044422 A1 | 2/2005 | Cantrell et al. | |
| 2005/0138417 A1 | 6/2005 | McNerney et al. | |
| 2005/0149715 A1 | 7/2005 | Rhoades | |
| 2005/0210151 A1 | 9/2005 | Abdo et al. | |
| 2005/0235352 A1 | 10/2005 | Staats et al. | |
| 2005/0267954 A1 | 12/2005 | Lewis et al. | |
| 2006/0039404 A1 | 2/2006 | Rao et al. | |
| 2007/0038681 A1 | 2/2007 | Pierce et al. | |

OTHER PUBLICATIONS

"Netfence VPN Connectors", phion Information Technologies GmbHFeb. 2006.

"The Aruba 200 Mobility Controller", Aruba Wireless Networks, Inc.2005.

Anonymous, "Corrent applicances using IDS 2004s: Unique Protection for Microsoft Exchange Server, Internet Information Server, and Windows-Based Virtual Private Networking", white paper, Sep. 2005.

Anonymous, "Internet Security & Acceleration Server 2004, ISA Server 2004: Unique Protection for Microsoft Exchange Server, Internet Information Server, and Windows-Based Virtual Private Networking", white paper, Jun. 2004.

Anonymous, "Internet Security & Acceleration Server 2004, Partner Revenue Opportunities with Microsoft ISA Server 2004", Microsoft Corporation, 2004.

Anonymous, "netfence VPN Connectors", phion Information TEchnologies GmbH, Feb. 2006.

Anonymous, "The Aruba 200 Mobility Controller", Aurba Wireless Networks, Inc., 2005.

Anonymous, NetVanta 2050/2054, Adtran, Inc., Small Office and Home Office VPN Gateway and Firewall, Aug. 2005.

The NPLS can be found in the parent case, U.S. Appl. No. 16/412,395.

Corrent appliances using ISA 2004s: Unique Protection for Microsoft Exchange Server, Internet Information Server, and Windows-Based Virtual Private Networking, White PaperSep. 2005.

Internet Security & Acceleration Server 2004, "ISA Server 2004: Unique Protection for Microsoft Exchange Server, Internet Information Server, and Windows-Based Virtual Private Networking", White PaperJun. 2004.

Internet Security & Acceleration Server 2004, "Partner Revenue Opportunities with Microsoft ISA Server 2004", Microsoft Corporation2004.

NetVanta 2050/2054, Adtran, Inc., Small Office and Home Office VPN Gateway and FirewallAug. 2005.

"Enabling Secure Mobility with Exchange and NS Series Security Appliances", Network EnginesInc. 2005.

* cited by examiner

D:\.Net2003\RASInspect\bin\Debug\RasInsp...

File    Hash

[RASInspect]
dllName = "RASISet"

[SBMessages]
SBGreeting = "Please Standby – Performing Inspection..."
SBComplete = "Inspection Complete..."
SBInspFailed = "Your system must be remediated!"

[TBMessages]
TBGreeting="Beginning process to inspect your computer..."
TBLookupConfig="Looking up Configuration Information..."
TBValidateExe="Validating Executable..."
TBNewEXE="New version is available. Downloading..."
TBErrUpdateEXE="Error updating executable! If this continues, please..."

FIG. 8

REMOTE ACCESS SERVICE INSPECTOR

BACKGROUND OF THE INVENTION

The present invention relates generally to information processing on a computer network, and, more particularly, to methods and systems for providing protected remote access to an information technology infrastructure.

A large number of businesses and individual users use portable computing devices, such as laptop computers and hand-held devices, that are moved frequently and that can connect into more than one network. Users now have laptop computers that are connected to a corporate network during the day and to a home network during the evening. Many users also have home computers that are remotely connected to various organizations from time to time through wide-area networks, including the Internet. The number of computing devices and the number of networks that have these devices connected to the network, have increased dramatically in recent years. Users are also using the Internet to remotely connect to a number of different systems and networks. A user may connect his or her home computer to a corporate network through a virtual private network (VPN), which creates a secure session between the home computer and the corporation's network.

As more computers are connecting to a number of different networks, a new set of challenges face network administrators and individual users alike. Previously closed computing environments are now opening to a worldwide network of computer systems. Specific challenges include attacks by perpetrators capable of damaging the local computer systems, stealing proprietary data and programs, unauthorized access to external data, infiltration by viruses, and employee abuse of business computer resources.

A mechanism traditionally used to address several of the challenges is a firewall product. Traditional firewall products guard a boundary or gateway between a local network, such as a corporate network and a larger network, such as the Internet. These products primarily regulate traffic between physical networks by establishing and enforcing rules that regulate access based upon the type of access request, the source requesting access, the connection port to be accessed, and other factors. One of the implications of the increasing number of devices occasionally connected to different networks is that traditional corporate firewall technologies are no longer effective. A corporate firewall provides some degree of protection when a device is connected to that particular corporate network, but it provides no protection when the device is connected to other networks. Additionally, a traditional firewall may not protect against intrusions originating from a remote device that is connected to a corporate network.

Another protection measure implemented by many users and administrators is to install an anti-virus application on their machines to provide protection against infiltration by viruses. An anti-virus application typically includes an engine that has a database or repository of virus information that enables identification of viruses and other malicious code. At specified intervals, the antivirus engine will scan the computer system to detect any files that match known virus signatures.

Although anti-virus products provide considerable protection to the user and administrators of computer systems and networks, several problems remain. One problem is that if a remote client machine connected to a corporate network through a VPN gateway is infected with a virus, it may infect other machines on the same network. An infected computer that is connected to a corporate local area network (LAN) may put the entire network at risk. The computer may be infected with a virus that intentionally tries to spread itself to other machines in the network. One machine that is not running the correct anti-virus engine or is not equipped with current virus signature definitions may jeopardize the security of the entire network. Ensuring that machines are running current anti-virus programs is particularly important, as virus issues are very time sensitive. It becomes critical, therefore, to promptly update anti-virus applications on all machines in a network in a timely fashion before the network is infiltrated by a newly released virus.

Microsoft Corporation has developed the remote quarantine service (RQS) for the purpose of allowing computers to connect to a remote access server without giving them full access to the network until the computer can be inspected. This service works in conjunction with a remote quarantine client (RQC) to release a computer in quarantine once it has been inspected. Currently, Microsoft and other vendors do not offer a mechanism to perform a client inspection. The present invention was developed to perform remote client inspection and makes use of the remote quarantine service and the remote quarantine client.

SUMMARY OF THE INVENTION

The invention is directed to a method and computer program product to protect an information technology infrastructure from malicious attacks while allowing its authorized users to have remote protected access to a company's network services. The RAS Inspector invention is applicable to any computer network used for any purpose.

In one aspect of the invention, a method, system, and program product are provided for protected remote access from a remote access client to a remote access server over a computer network through a plurality of inspections. A remote access configuration file is created for the remote access client. A digital hash of the configuration file is then generated. The digital hash is compared with a configuration file stored at a predefined web location. If the comparison results in a match between the digital hash and the stored configuration file, a digital hash comparison is performed between an encrypted remote access configuration file and an encrypted configuration file stored at the predefined web location. If the plurality of inspections are passed, the remote access client is released from a quarantine state and a virtual private network (VPN) connection to the remote access server is established.

BRIEF DESCRIPTION OF THE DRAWINGS

These and other advantages and aspects of the present invention will become apparent and more readily appreciated from the following detailed description of the invention taken in conjunction with the accompanying drawings, as follows.

FIG. 8 illustrates a user interface a clear text file of an encrypted file in accordance with an exemplary embodiment of the invention.

DETAILED DESCRIPTION OF THE INVENTION

Figure 1:
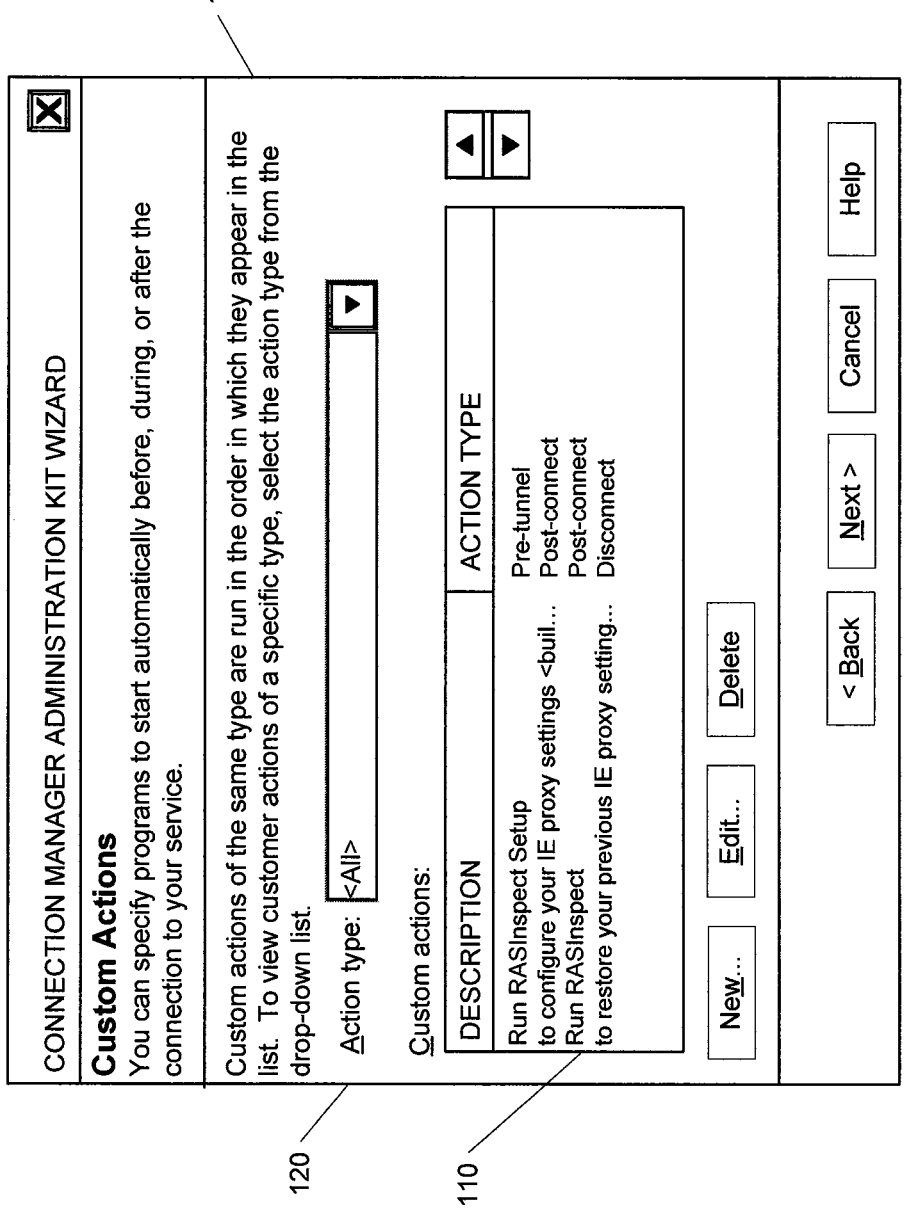
FIG. 1 illustrates a user interface for selecting custom actions using the Connection Manager Administration Kit (CMAK) wizard in accordance with an exemplary embodiment of the invention.

The following description of the invention is provided as an enabling teaching of the invention and its best, currently known embodiment. Those skilled in the relevant art will recognize that many changes can be made to the embodiments described, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and may even be desirable in certain circumstances, and are a part of the present invention. Thus, the following description is provided as illustrative of the principles of the present invention and not in limitation thereof, since the scope of the present invention is defined by the claims.

Definition of Terms

Internet Protocol Security (IPSec)—IPSec is a set of protocols developed by the Internet Engineering Task Force (IETF) to support secure exchange of data packets at the Internet Protocol (IP) layer. IPSec has been deployed widely to implement virtual private networks (VPNs). IPSec supports two encryption modes: transport and tunnel. Transport mode encrypts on the data portion (i.e., payload) of each packet, but leaves the header untouched. The more secure tunnel mode encrypts both the header and the payload of each packet. On the receiving side, an IPSec compliant device decrypts each packet.

Virtual Private Network (VPN)—A VPN is an on-demand "tunnel" connection over a public or private network between two computers at different locations. There are a number of systems that enable creation of virtual private networks using the Internet as the medium for transporting data. These systems use data encryption and other security mechanisms to ensure that only authorized users can access the network and that the data being transmitted cannot be intercepted.

Remote Access Client—A computer running a Windows operating system that creates either a dial-up or virtual private network connection to a remote access server. The remote access client can use either a manually configured or a Connection Manager component.

Remote Access Server (RAS)—A computer running a member of Windows 2000 Server or Windows Server 2003 families.

Remote Access Quarantine Client (RQC)—RQC works on the remote access client as a notification component. It verifies to the listener component that the remote access client has met network requirements.

Remote Access Quarantine Agent (RQS)—Tool that works as part of Windows Server 2003 Network Access Quarantine Control to restrict remote access clients from full access to a network until they meet the requirements of the network. RQS works on the remote access server as a listener component. It informs the remote access server when a client can be taken out of quarantine mode.

Connection Manager—Microsoft software component that provides support for local and remote connections for remote access client access to remote access server. Once the Connection Manager executable is run, it enters the proper settings on the client computer for remote access to the server on which the Connection Manager component was formed. Connection Manager establishes virtual private network connections to the remote server.

Connection Manager Administration Kit (CMAK)—The CMAK configuration wizard builds a service profile which is a set of files that is distributed to users so that they can easily install and run a custom version of Connection Manager. The configuration wizard enters permanent information and settings into the Connection Manager component.

The Remote Access Service (RAS) Inspector is a tool for inspecting personal computers running a Microsoft operating system, such as Windows XP, before attempting to connect to a company Internet IPSec Virtual Private Network (VPN) that is utilizing the Remote Quarantine Agent (RQS) service. RAS Inspector provides a customizable inspection of a remote client and upon successfully passing the inspection, it provides a Remote Quarantine Client (RQC) function to request release of the remote client from quarantine by the RQS. The RAS Inspector must be run in conjunction with the Microsoft Connection Manager as built from the Microsoft Connection Manager Administration Kit (CMAK). RAS Inspector is completely configurable with an auto-updating, encrypted configuration file. When launched appropriately from the Dynamic Link Library (DLL), the executable will auto-update when new versions are detected.

The RAS Inspector performs a digital hash comparison of the local executable configuration file to one in a predefined web location on the Internet. The purpose of the digital hash function is to produce a fingerprint of a file, message, or block of data that cannot be changed without hashing to a different value. To be of cryptographic use, a hash function is typically chosen such that it is computationally infeasible to find two distinct inputs that hash to a common value. If the hash comparison is not a match, RAS Inspector will download the new executable and exit, providing an exit code identifying that a new version is available to the launching DLL. The launching DLL will rename the file and relaunch the executable. The RAS Inspector performs a digital hash comparison of the local encrypted configuration file to one in a predefined web location on the Internet. If the hash comparison is not a match, RAS Inspector will download and replace the local encrypted configuration file.

The RAS Inspector performs the following checks:
1. a live update of virus definitions;
2. a validation that the virus definitions exist and are within a predefined age;
3. a check that the anti-virus software is running and active;
4. a check of predefined operating system (OS) patches by checking each file in the patch for appropriate versions and time stamps.

For the inspection of the OS patches, each patch is allowed a force switch as well as a force by date.

If the remote computer passes inspection, the Connection Manager will continue through the process of completing the connection and the quarantine will be released. If the computer fails the inspection, the Connection Manager will not continue through the connection process. The configuration file has settings for certain checks that allow the administrator to force a failure if the inspection does not pass or simply inform that remediation is required.

Should the process be bypassed in any way, the remote computer will not be released from quarantine and it will not be able to access anything through the VPN tunnel. After the connection has taken place and the quarantine has been cleared, RAS Inspector performs an additional hash comparison of the DLL and downloads a new one if appropriate.

The following components are required on the local machine for the correct operation of the RAS Inspector invention: RASISet.dll, RASInspect.exe, RASInspect.cfg, Application.htm, OSInspector.cfg, and Connection Manager. The component names are exemplary and are not a limitation on the invention.

RASISet.dll is launched from the Connection Manager pre-tunnel stage. It launches the RASInspect.exe and when returned with appropriate code, checks for a new version, copies it over and re-launches.

RASInspect.exe is the main executable. It performs inspection of the remote computer and releases quarantine upon a successful inspection.

RASInspect.cfg is the encrypted configuration file. It contains all of the information required to perform the inspection including the text strings used by the graphical interface, the web path for updates, the OS patch inspector configuration files, etc.

Application.htm is the digital hash file of RASInspect.exe. It is compared with the hash file at the predefined web address.

OSInspector.cfg is the file that is used for the inspection of individual operating system patches. The name of the file should actually correspond to the name of the patch being inspected. There can be as many OSInspector.cfg files as are necessary to assure that all appropriate patches have been applied. The OSInspector.cfg files are not encrypted.

Connection Manager is Microsoft's Connection Manager, appropriately configured using the Connection Manager Administration Kit (CMAK).

A component is required for the creation and maintenance of the RASInspect.cfg file and the creation of digital hash files for each of the aforementioned components. For obvious reasons, this file, referred to as CryptoText.exe herein, should not reside on the client machine which is to be inspected. Nor should it reside on the web site where the updated files are placed. This executable provides the key and hashing algorithm for all of the encryption and hashing used during the operation.

In addition to all of the files described in the local workstation location above, the files described in the following paragraphs are kept at the predefined web location and are used for validating the files used during the inspection as well as for providing updated files if required. The names used are exemplary and are not a limitation on the invention.

RASInspect.htm is the digital hash file for RASInspect.cfg. It provides the hash code for the current version of RASInspect.cfg. During inspection, a hash code is generated of the local RASInspect.cfg file and compared to the one provided in this file. If they are the same, then the correct version of the RASInspect.cfg file is on the local machine. If they are different, then the file is updated.

RASISet.htm is the digital hash file for RASISet.dll. It provides the hash code for the current version of RASISet.dll. During inspection, a hash code is generated of the local RASISet.dll file and compared to the one provided in this file. If they are the same, then the correct version of the RASISet.dll file is on the local machine. If they are different, then the file is updated.

OSInspector.htm is the digital hash file for OSInspector.cfg. It provides the hash code for the current version of OSInspector.cfg. During inspection, a hash code is generated of the local OSInspector.cfg file and compared to the one provided in this file. If they are the same then the correct version of the OSInspector.cfg file is on the local machine. If they are different, then the file is updated. Note that an OSInspector.cfg file should be created for each OS patch being inspected and the name of the .cfg file should correspond to the patch name. A corresponding hash .htm file should then be generated for each .cfg file. The OSInspector configuration files follow a very specific format which must be adhered to in order for the patch inspections to be properly performed.

RASInspect Configuration File

The RASInspect.cfg file is arranged in the same format as an initialization (ini) file. Each section of the confirmation file is named using a string enclosed within square brackets. Each value is given a string name followed by an equals sign, then a string value assigned to the name. The exception to this is the OSInspector section described below. This section is enumerated according to the number of patches that are required to be checked. Each line in the OSInspector section follows the format of "patchfilename;opttruefalse;optfaildate," where patchfilename is the name of the OSInspector.cfg file without the extension. This may be followed by a semicolon; then an optional Boolean (true or false) referring to whether the patch will force fail if not correctly installed. The default, if not explicitly set, is false. If the force fail is set to false, the line may be followed by another semicolon and an optional force fail by date in the format "mm/dd/yyyy". If a date is placed in this position and the second option is set to "true," the date is ignored and the force fail takes place immediately upon a failed inspection.

RASInspect Configuration Sections

[Registry]—Defines the sections of the registry used to store and retrieve information. Note that all data is stored in an encrypted format.

RegHive—Defaults to HKLM.

RegPath—This is the actual string used for the registry path. It should neither begin nor end in a backslash. However, backslashes can be used to designate subfolders in the path.

[Connect]—Defines how the computer connects through the Internet.

String—The connect string used which corresponds to what the quarantine server is looking for in order to release quarantine.

Port—The port used to connect to the RAS server.

WebURL—The web address used for checking the digital hash code of components and for downloading update components.

InspTimeout—A numeric value which designates the time allowed between when an inspection is done and the actual connection is made, prior to quarantine release. If an inspection is made and more than this amount of time passes before the quarantine release is attempted, the inspection is rendered invalid.

[AV]—Defines the antivirus system inspection.

avName—This is the name of the antivirus system. It is used for text messages.

datFile—The complete path to the antivirus definition file including the name of the file itself.

iSpan—A numeric value which states the number of days in age which is acceptable for an antivirus definition file. If the antivirus definition file is older than this, RASInspect will fail the inspection and not allow quarantine release.

avProcessName—The name of the process which provides the antivirus services. This name is used to check that the process is running. If this process is not found to be running, RASInspector will fail the inspection and not allow quarantine release.

UpdateCmd—Complete path including the file name of the file which is launched to provide the LiveUpdate function of the antivirus software.

UpdateArg—The argument passed to the LiveUpdate executable.

UpdateForce—Boolean (true or false) referring to whether failure to run LiveUpdate will force a failure. After the LiveUpdate, RASInspect checks the date of the AntiVirus definition file. If UpdateForce is set to "false" and the definition file date is within the number of days set in iSpan, RASInspect will simply warn about the LiveUpdate failure and allow quarantine release.

[OSInspector]—Provides a list of the OSInspector configuration files. The list should contain only the left side of the file name and not include the period (or "dot") or the extension. This section is an exception to the format for the rest of the RASInspect configuration file. Since it is enumerated, allowing for a supposed unlimited number of .cfg files to be checked, this section does not follow the "name=value" format of the rest of this file. Each line in the OSInspector section follows the format of "patchfilename;opttruefalse;optfaildate". In this format, patchfilename is the name of the OSInspector.cfg file without the extension. This may be followed by a semicolon; then an optional Boolean (true or false) referring to whether the patch will force fail if not correctly installed. The default, if not explicitly set, is false. If the force fail is set to false, the line may be followed by another semicolon and an optional force fail by date in the format "mm/dd/yyyy". If a date is placed in this position and the second option is set to "true", the date is ignored and the force fail takes place immediately upon failed inspection.

OSInspector;opttruefalse;optfaildate—This is an example of how one file name can be represented. The name itself, of course, should reflect the actual name of the OS patch. There can be as many lines as there are patches that need to be inspected. Each line should follow the format of "patchfilename;opttruefalse;optfaildate", as described in the preceding paragraph.

[RASInspect]—Provides values used to customize the RAS Inspection process.

dllName—Provides the name of the launching dll.

[SBMessages]—Provides customized message strings for the StatusBar.

SBGreeting—The first statement given as RASInspect begins.

SBComplete—Message given in StatusBar upon completion of a successful inspection.

SBInspFailed—Message given in the StatusBar upon the event of an inspection failure.

[TBMessages]—Provides customized message strings for the TextBox providing status of the inspection process.

Current messages used (an asterisk indicates that changing the string will not currently affect the executable file):

*TBGreeting="Beginning process to inspect your computer . . . "
*TBLookupConfig="Looking up Configuration Information . . . "
*TBValidateEXE="Validating Executable . . . "
*TBNewEXE="New version is available. Downloading . . . "
*TBErrUpdateEXE="Error updating executable! If this continues, please contact support . . . "
*TBErrInternetConn="Possible error connecting to Internet—Exiting . . . "
*TBConfigNotFound="Configuration Information was not found. Exiting . . . "
*TBConfigCorrupt="Configuration Information is corrupted. Exiting . . . "
*TBConfigValid="Configuration Information is valid."
*TBCollectingData="Collecting data . . . "
TBBeginInspection="Preparing to perform inspection . . . "
TBCheckAVDef="Checking AntiVirus Definitions . . . "
TBRunLiveUpdate="Running LiveUpdate . . . "
TBAVDefNotFound="AntiVirus definitions were not found!"
TBAVDefOld="AntiVirus definitions are out of date . . . "
TBAVCurrent="Antivirus definitions are up to date."
TBAVCheckRun="Checking that AntiVirus software is running . . . "
TBAVRunning="Antivirus Software is running . . . "
TBAVNotRunning="Antivirus Software is not running . . . "
TBInspSuccess="Everything looks good! Please input your PIN!"
TBInspectFailed="For the protection of the Company computing infrastructure, your computer was inspected and found to be missing important components. For this reason you will not be allowed to connect to the Company network until the following issues have been resolved.
TBInspectNotPass="For the protection of the Company computing infrastructure, your computer was inspected and found to be either missing important components or they are out of date. For this reason you may be denied access to the Company network in the near future until the following issues have been resolved.
TBInspectionOld="Inspection Invalidated—EXITING!"
TBReleasingQuarantine="RAS Connection Complete! Attempting to release Quarantine . . . "
TBRQErrUnknown="An unknown error has occurred! Exiting now . . . "
TBRQErrNoRAS="You are not running RAS! Is this a Test? Exiting now . . . "
TBRQSuccess="You have been accepted. Go forth and Compute!"
TBRQDenied="You have been denied access! The reason is outside the scope of inspection. Please contact your administrator! Exiting now . . . "

TBRQErrShouldNot="Made it to the end for some unknown reason. Exiting now . . . "
[IFMessages]—Provides customized strings used upon the Failure of an inspection test:
IFAVDefNotFound="Error in performing LiveUpdate (no definitions found!)"
IFAVDefOld="Error in performing LiveUpdate (definitions still out of date!)"
IFAVNotRunning="AntiVirus software is not running!"

The following is an exemplary configuration of the RASInspect.cfg file with each section of the configuration file enclosed within brackets:

[Registry]
RegHive=HKLM
RegPath="Software\CompanyName\RASInspect"
[Connect]
String="XXXXXXXXXXXXXX"
Port=9999
WebURL=https://iras.company.com/XXXXXXXXXXXXXXXXXXXXXXXXX/
InspTimeout=2
[AV]
avName="Symantec"
datFile="c:\program files\common files\symantec shared\virusdefs\definfo.dat"
iSpan=8
avProcessName="RTVSCAN"
UpdateCmd="C:\PROGRAM FILES\NAVNT\VPDN_LU.EXE"
UpdateArg="/fUpdate/s"
UpdateForce=false
[OSInspector Files]
OSInspector;false;11/02/2004
[RASInspect]
dllName="RASISet"
[SBMessages]
SBGreeting="Please Standby—Performing Inspection . . . "
SBComplete="Inspection Complete . . . "
SBInspFailed="Your system must be remediated!"
[TBMessages]
The TB messages are the same as described above and are not repeated here for conciseness.
[IFMessages]
IFAVDefNotFound="Error in performing LiveUpdate (no definitions found!"
IFAVDefOld="Error in performing LiveUpdate (definitions still out of date!"
IFAVNotRunning="AntiVirus software is not running!"

Configuring Connection Manager for RAS Inspector

The Connection Manager should be built using the Microsoft Connection Manager Administration Kit (CMAK). The use of this kit provides for many possible configuration profiles of the Connection Manager. The following description is limited to only the parts required for the correct setup of the RAS Inspector tool.

The CMAK wizard is run by launching cmak.exe. This wizard builds a self-extracting executable which, when run on the workstation, builds the Connection Manager into the selected profile on the workstation.

When launching the CMAK wizard, the user selects or names the filename of the profile that is being created. The user clicks "Next" through the wizard to configure and customize connection selections until the "Custom Actions" page 100 illustrated in FIG. 1 is displayed. This page is used to specify programs that are to start automatically before, during, or after the VPN connection is made. Custom actions of the same action type are run in the order in which they appear in the list 110. In order to view the custom actions of a specific type, the user selects the action type in the drop down list that is displayed when the drop down box 120 is selected. From the Custom Actions page, the user can create new or edit existing pre-tunnel and post-connect actions.

Figure 2:
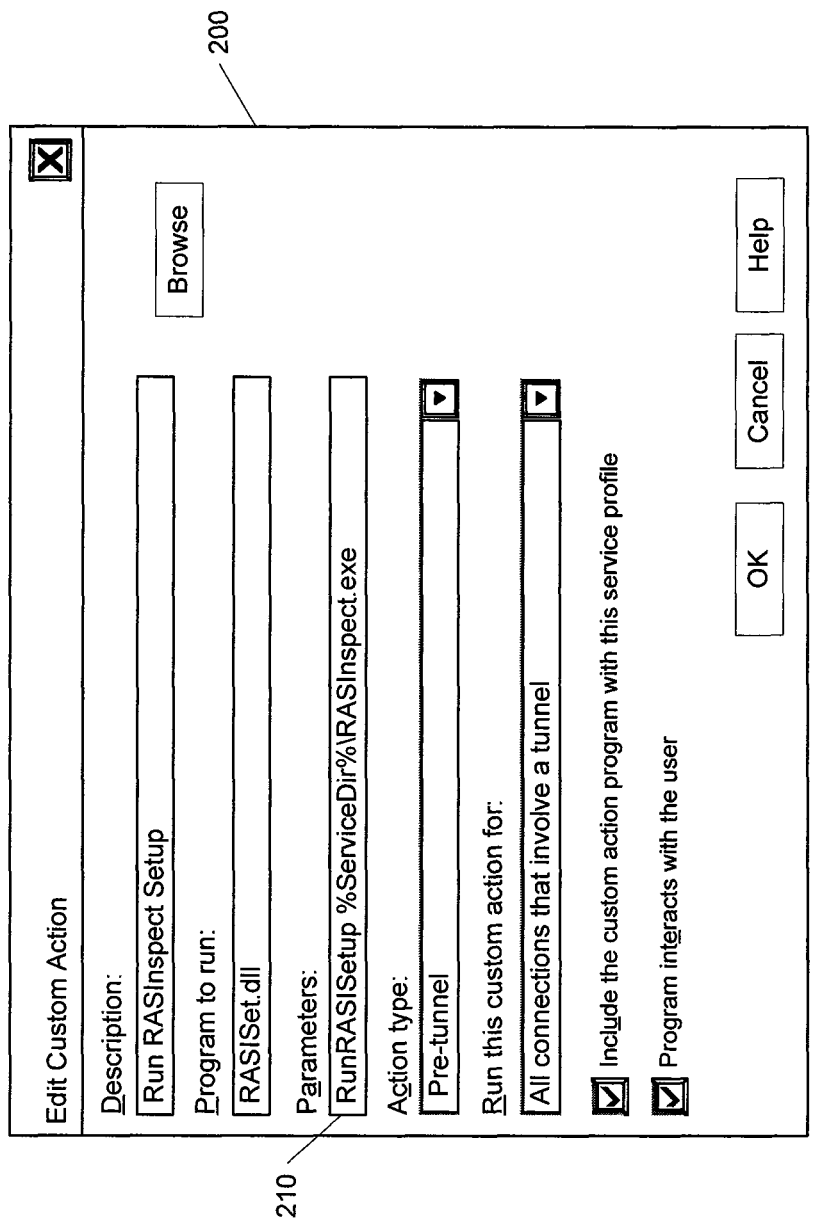
FIG. 2 illustrates a pre-tunnel action user interface in accordance with an exemplary embodiment of the invention.

An exemplary "Edit Custom Actions" dialog box 200 for a pre-tunnel action is illustrated in FIG. 2. The Edit Custom Action page includes a description field, a program to run field, a parameters field, an action type field, and a "run this custom action for" field. In the description field, the user enters a descriptive title for the action (e.g., RunRASInspectSetup). In the program to run field, the user enters the name of a program or script file to run for network policy compliance testing (e.g., RASISet.dll). In the parameters field, the user enters the set of command line parameters that are passed to the program identified in the program to run field. In this exemplary display, the complete "Parameters" field 210 could read:

RunRASISetup % ServiceDir %\RASInspect.exe setup setup setup setup 0

It should be noted that there are no commas or quotes in this string.

Figure 3:
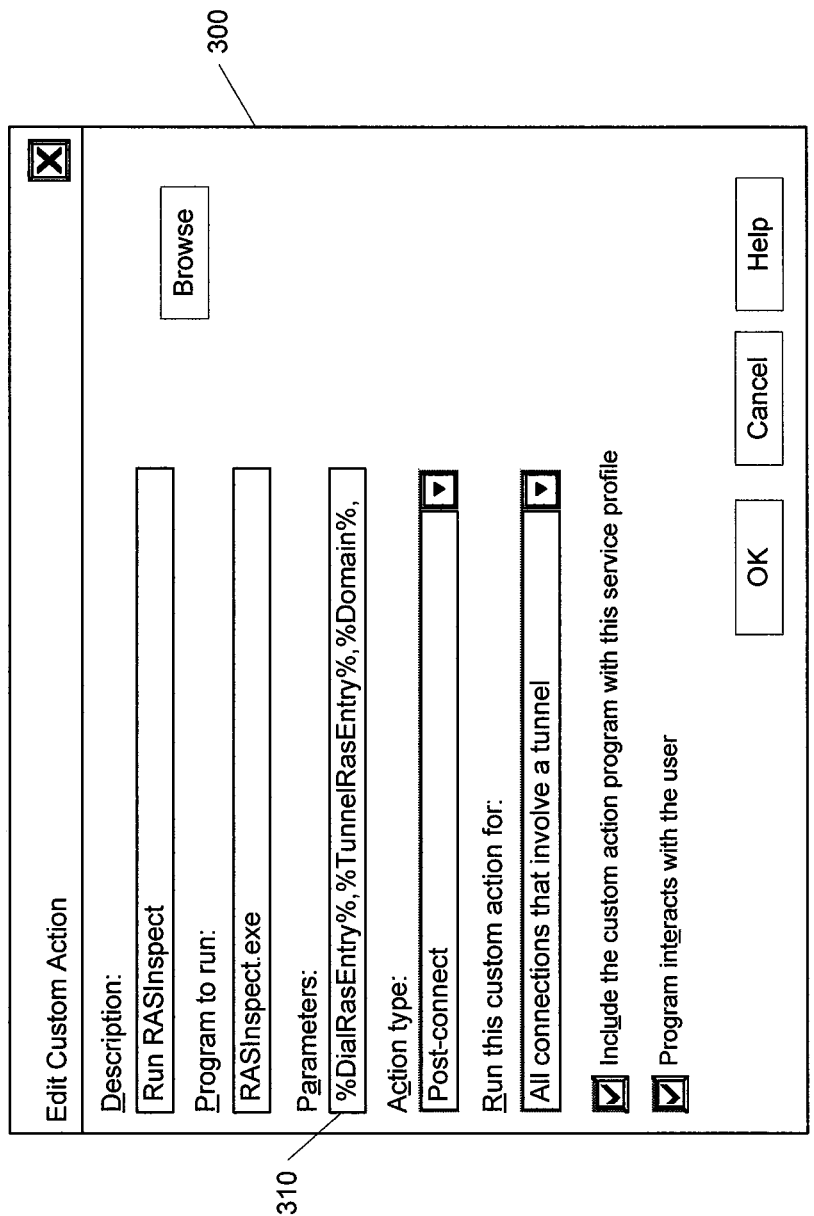
FIG. 3 illustrates a post-connect action user interface in accordance with an exemplary embodiment of the invention.

An exemplary "Edit Custom Actions" dialog box 300 for a post-connect action is illustrated in FIG. 3. In the description field, the user enters a descriptive title for the action (e.g., RunRASInspect). In the program to run field, the user enters the name of a program or script file to run for network policy compliance testing (e.g., RASInspect.exe). In the parameters field, the user enters the set of command line parameters that are passed to the program identified in the program to run field. In this exemplary display, the complete "Parameters" field 310 could read:

% DialRasEntry %, % TunnelRasEntry %, % Domain %, % UserName %, 1

It should be noted that the use of commas in this field of the post-connect screen is different than with the pre-tunnel action screen.

Figure 4:
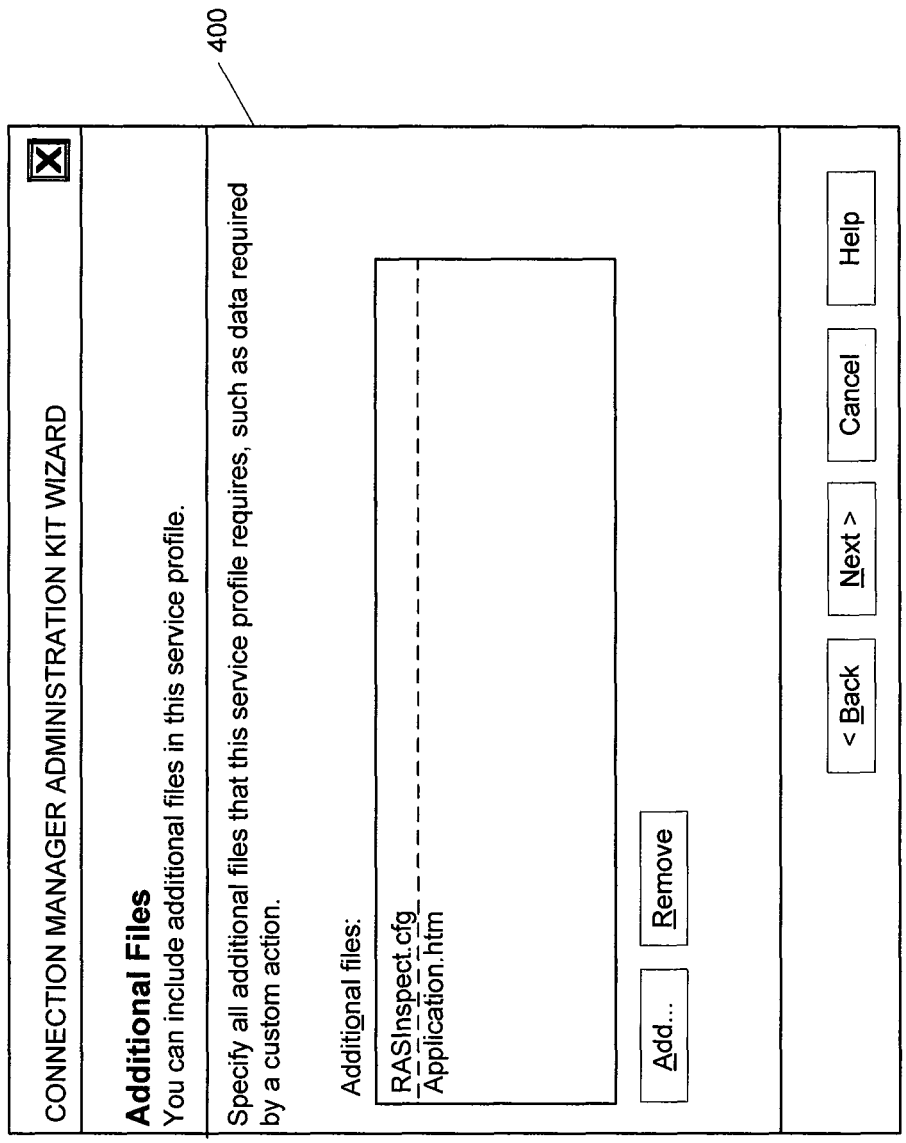
FIG. 4 illustrates an additional files user interface in accordance with an exemplary embodiment of the invention.

The user continues to click "Next" on the displayed CMAK wizard pages until the "Additional Files" page 400 illustrated in FIG. 4 is displayed. The user specifies all the additional files that the service profile requires, such as data required by a custom action. As shown in this figure, the user adds the following two files to the "Additional Files" list: (1) RASInspect.cfg; (2) Application.htm.

The rest of the CMAK wizard is then completed as would normally be done. The final page displayed by the configuration wizard identifies where the self-installing executable file is located on the client hard drive.

CryptoText Component

CryptoText is a simple program designed to create and hash an encrypted configuration file which can be unencrypted and used by RAS Inspector. The CryptoText component will also create all of the hash files required for proper operation of RAS Inspector.

Figure 5:
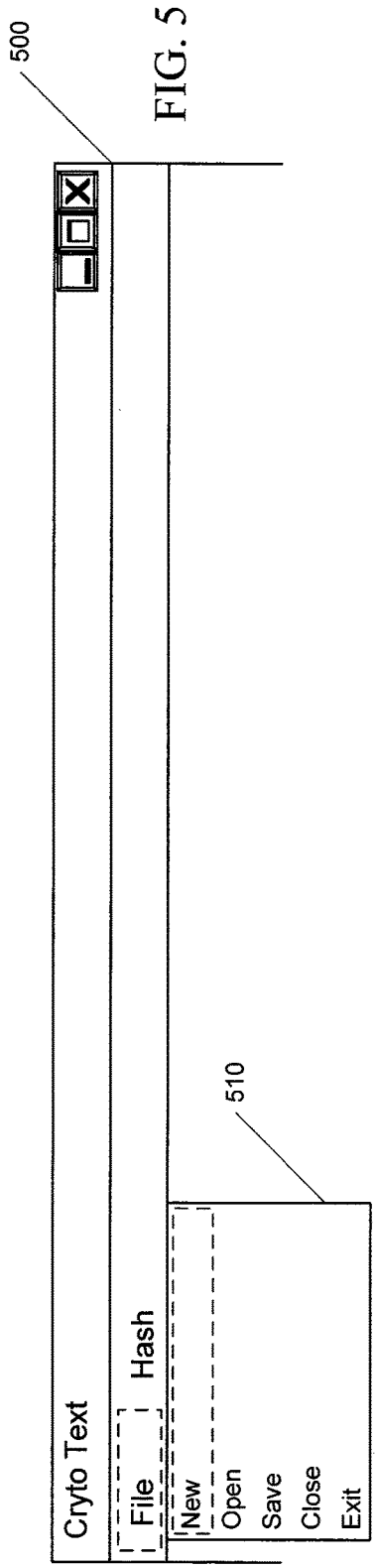
FIG. 5 illustrates a user interface drop down box for a crypto text component in accordance with an exemplary embodiment of the invention.

To run CryptoText, the user simply launches CryptoText.exe. As illustrated in FIG. 5, the user selects the "File" drop down menu 510 on the Crypto Text screen, then "Open" to open an existing file or "New" to create a new one.

Figure 6:
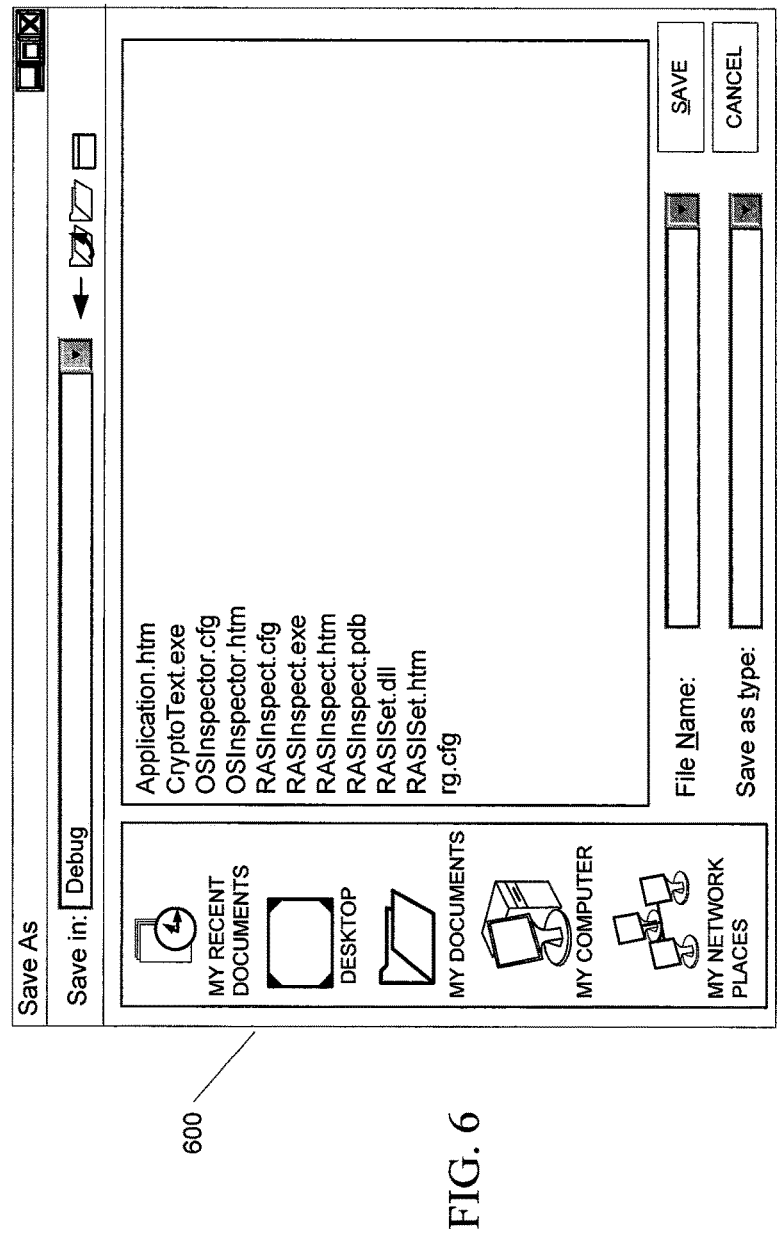
FIG. 6 illustrates a user interface dialog box for saving an encrypted file in accordance with an exemplary embodiment of the invention.

Selecting "New" from the "File" drop down menu 510 will provide a "Save As" dialog box 600, such as illustrated in FIG. 6. The user may type in a new file name or select an existing one which will be overwritten. With the new file named, the user can type in clear text anything that is required. When finished, the user simply saves the file. CryptoText will encrypt the text into the file and create a hash file of the encrypted file with an .htm extension.

Figure 7:
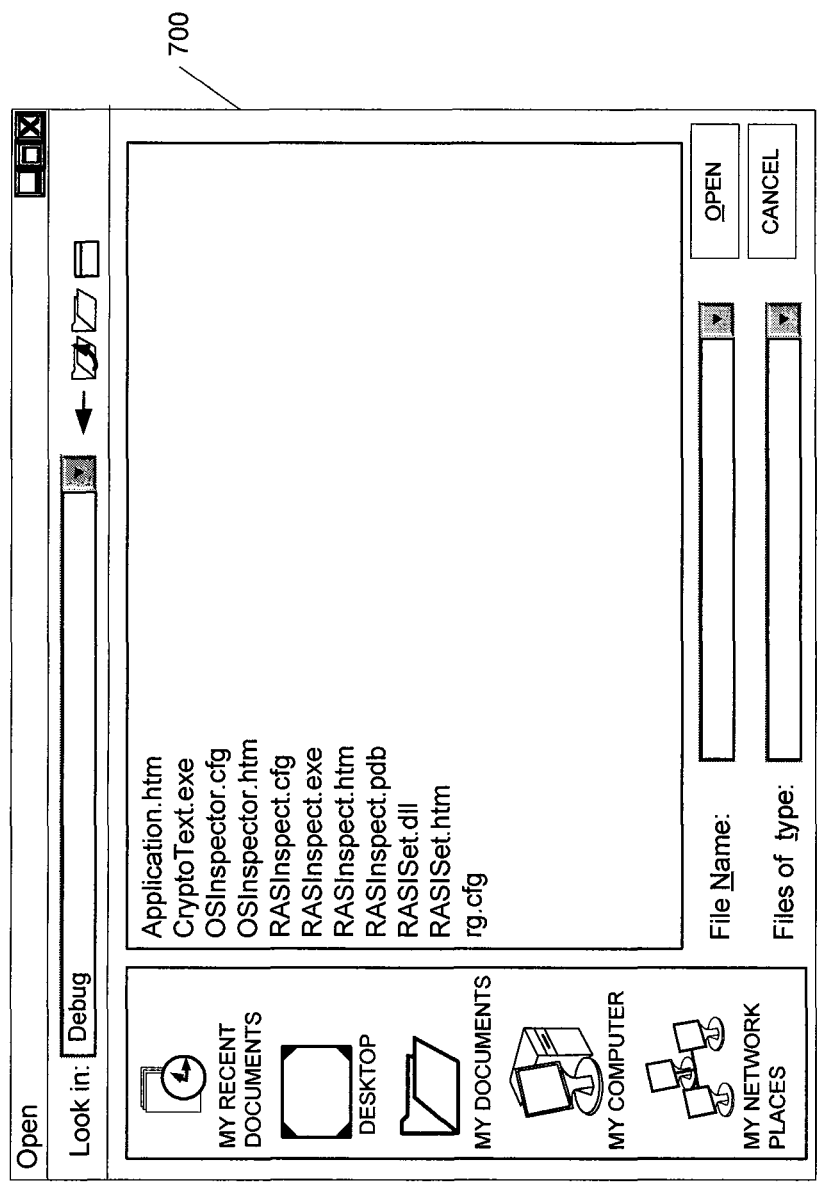
FIG. 7 illustrates a user interface for opening an encrypted file in accordance with an exemplary embodiment of the invention.

Selecting "Open" from menu 510 will provide a "File Open" dialog box 700, such as illustrated in FIG. 7. The user selects the file that he wants to edit. Note that CryptoText can only open an existing file already encrypted by CryptoText or one with the exact same encryption algorithm used by CryptoText. Once the file is opened, CryptoText will display the encrypted file in clear text, such as illustrated in FIG. 8.

From this point, the user should be able to edit the text as needed, then save it. Once saved, the file will again be encrypted and a new hash file (with an .htm extension) will be created.

Figure 9:
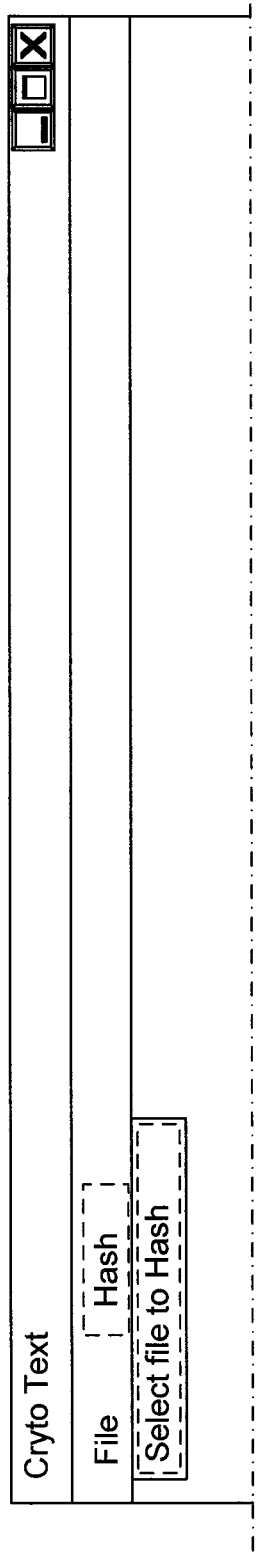
FIG. 9 illustrates a user interface for selecting a file to hash in accordance with an exemplary embodiment of the invention.
Figure 10:
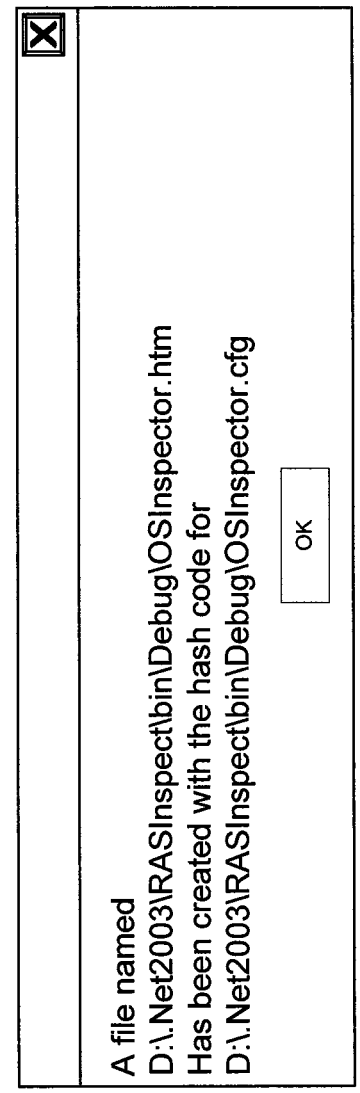
FIG. 10 illustrates a message generated by the crypto text component after hashing a non-executable file in accordance with an exemplary embodiment of the invention.

CryptoText can also be used to create hash files for other than encrypted configuration files. To do so, the user can select the "Hash" drop down menu, then "Select File to Hash," such as illustrated in FIG. 9. Doing so will bring up another "File Open" dialog box. The user selects the file he wants to hash. Upon doing so, he will receive a messagebox, such as illustrated in FIG. 10.

Figure 11:
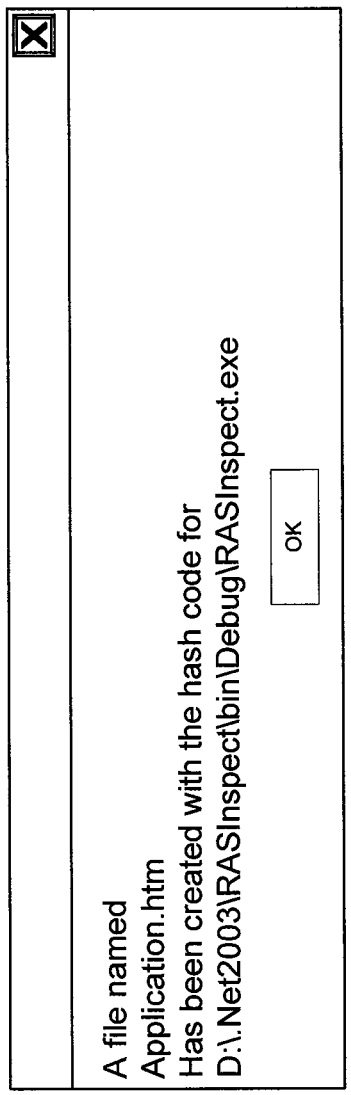
FIG. 11 illustrates a message generated by the crypto text component after hashing an executable file in accordance with an exemplary embodiment of the invention.

Note that the hash file will be named the same as the selected file with the exception that the extension will be .htm. The exception to this is when an executable file (.exe) is selected. In this case, the file will always be named "Application.htm," such as illustrated in FIG. 11.

It is important to be careful to use this feature for only one executable file per folder since otherwise the user could overwrite an important hash file with one that is not correct for the current application.

Figure 12:
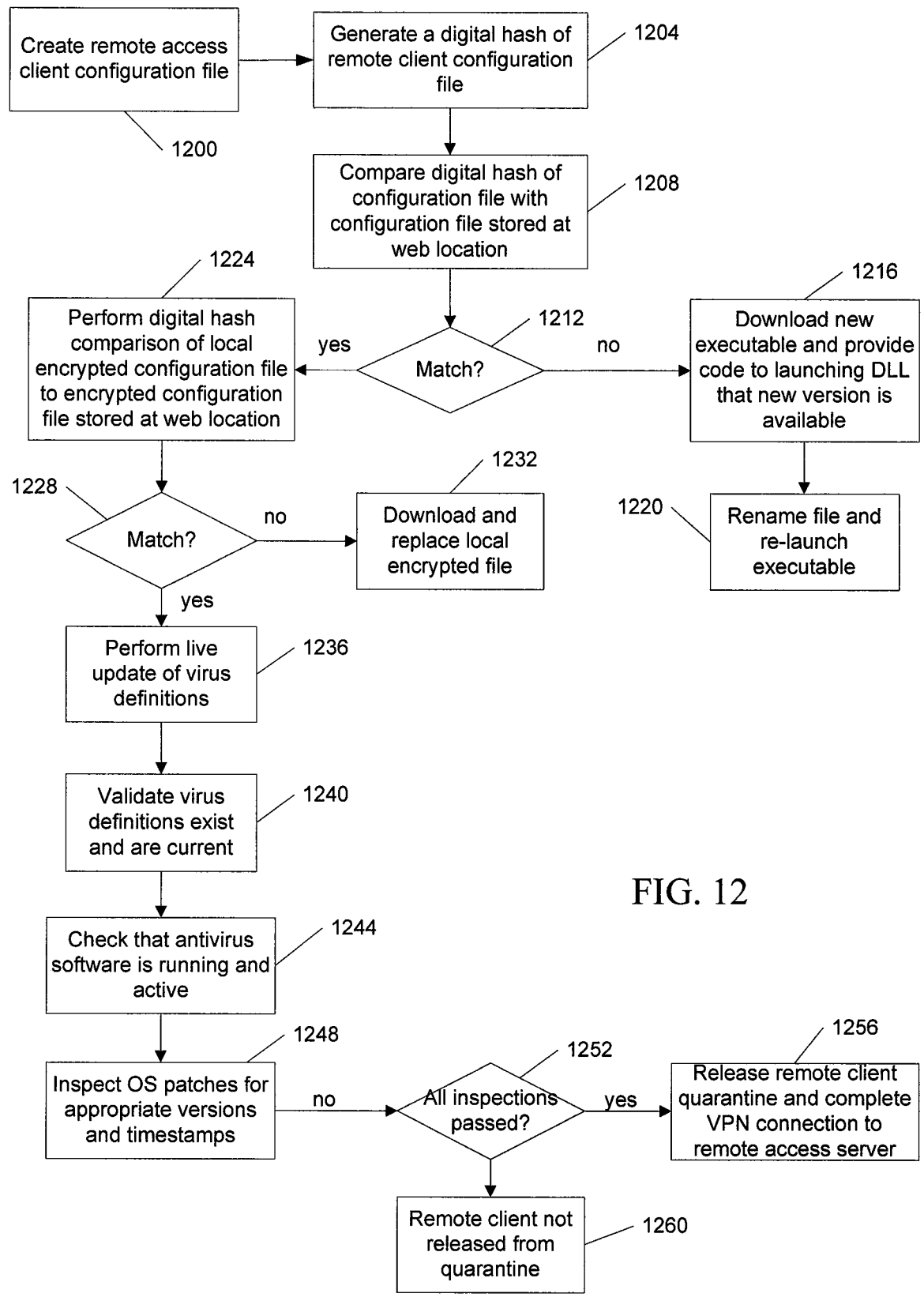
FIG. 12 illustrates the processing logic for the RAS Inspector in accordance with an exemplary embodiment of the invention.

FIG. 12 illustrates the processing logic for the RAS Inspector in an exemplary embodiment. By way of example and not limitation, the processing logic can be implemented in a remote access client running a Microsoft Windows platform, such as Windows XP. Processing begins with creating a remote access client configuration file as indicated in logic block 1200. A digital hash of the remote client configuration file is then generated as indicated in logic block 1204. The invention is not limited to any particular digital hash function. Digital hash functions are well-known in the art and there are many of such functions that would be suitable for use in the present invention.

In logic block 1208, a comparison of the digital hash of the configuration file is made with the configuration file stored at a web location. A test is then made in decision block 1212 to determine if a digital hash comparison resulted in a match. If the hash comparison is not a match, RAS Inspector will download a new executable and exit, providing an exit code that identifies the availability of a new version to the launching dll. This step is indicated in logic block 1216. The launching dll will then rename the file and re-launch the executable as indicated in logic block 1220.

If a digital hash comparison in decision block 1212 resulted in a match, then a digital hash comparison is performed of a local encrypted configuration file to an encrypted configuration file stored at the web location. This step is indicated in logic block 1224. If this digital hash comparison does not result in a match in decision block 1228, RAS Inspector then will download and replace the local encrypted configuration file. If the digital hash comparison results in a match in decision block 1228, a series of additional checks are then performed on the remote access client beginning with the step indicated in logic block 1236 in which a live update of virus definitions is performed. The next check is a validation that the virus definitions exist and that they are current (i.e., not out of date), as indicated in logic block 1240. Next, as indicated in logic block 1244, a check is made that the anti-virus software on the remote access client is running and that it is active. Finally, in logic block 1248, operating system patches are inspected for appropriate versions and time stamps.

If all checks and inspections pass, as tested for in decision block 1252, the remote client quarantine will be released and a VPN connection to the remote access server will be completed as indicated in logic block 1256. If not all inspections pass in decision block 1252, then the remote client will not be released from quarantine and will not be able to access the remote access server. This step is indicated in logic block 1260.

The system and method of the present invention have been described as computer-implemented processes. It is important to note, however, that those skilled in the art will appreciate that the mechanisms of the present invention are capable of being distributed as a program product in a variety of forms, and that the present invention applies regardless of the particular type of signal bearing media utilized to carry out the distribution. Examples of signal bearing media include, without limitation, recordable-type media such as diskettes or CD ROMs, and transmission type media such as analog or digital communications links.

The corresponding structures, materials, acts, and equivalents of all means plus function elements in any claims below are intended to include any structure, material, or acts for performing the function in combination with other claim elements as specifically claimed. Those skilled in the art will appreciate that many modifications to the exemplary embodiment are possible without departing from the spirit and scope of the present invention.

In addition, it is possible to use some of the features of the present invention without the corresponding use of the other features. Accordingly, the foregoing description of the exemplary embodiment is provided for the purpose of illustrating the principles of the present invention, and not in limitation thereof, since the scope of the present invention is defined solely by the appended claims.

What is claimed:

1. A method, comprising:
comparing, by a processor of a computer device, a first hash of a configuration file of a remote access client with a configuration file stored at a predefined web location using an executable file launched from a dynamic link library (dll);
comparing, by the processor, a second hash of a local configuration file to the first hash in response to identifying that the first hash matches the configuration file stored at the predefined web location; and
releasing, by the processor, the remote access client from a quarantine state and establishing a connection between the remote access client and a remote access server in response to both identifying that the second hash matches the first hash based on the comparing and identifying that the remote access client has passed a plurality of inspections.

2. The method of claim 1, further comprising:
updating virus definitions.

3. The method of claim 2, further comprising:
validating that the virus definitions exist and are current.

4. The method of claim 1, further comprising:
determining if an installed antivirus program is active and running on the remote access client.

5. The method of claim 1, further comprising:
inspecting at least one operating system patch for a current version and timestamp.

6. The method of claim 1, further comprising:
generating the hash of the encrypted remote access configuration file.

7. The method of claim 1, further comprising:
downloading and replacing the encrypted remote access configuration file in response to identifying that the second hash does not match the first hash based on the comparing.

8. The method of claim 7, further comprising:
hashing the dll in response to the releasing a quarantine state.

9. A non-transitory computer readable storage medium storing instructions that when executed by a processor cause the processor to perform:
comparing a first hash of a configuration file of a remote access client with a configuration file stored at a predefined web location using an executable file launched from a dynamic link library (dll);
comparing a second hash of a local configuration file to the first hash in response to identifying that the first hash matches the configuration file stored at the predefined web location; and
releasing the remote access client from a quarantine state and establishing a connection between the remote access client and a remote access server in response to both identifying that the second hash matches the first hash based on the comparing and identifying that the remote access client has passed a plurality of inspections.

10. The non-transitory computer readable storage medium of claim 9, wherein the instruction further cause the processor to perform:
updating a plurality of virus definitions.

11. The non-transitory computer readable storage medium of claim 10, wherein the instruction further cause the processor to perform:
validating that the virus definitions exist and are current.

12. The non-transitory computer readable storage medium of claim 9, wherein the instruction further cause the processor to perform:
determining if an installed antivirus program is active and run on the remote access client.

13. The non-transitory computer readable storage medium of claim 9, wherein the instruction further cause the processor to perform:
inspecting at least one operating system patch for a current version and timestamp.

14. The non-transitory computer readable storage medium of claim 9, wherein the instruction further cause the processor to perform:
generating the hash of the encrypted remote access configuration file.

15. The non-transitory computer readable storage medium of claim 9, wherein the instruction further cause the processor to perform:
downloading and replacing the encrypted remote access configuration file in response to identifying that the second hash does not match the first hash based on the comparing.

16. The non-transitory computer readable storage medium of claim 9, wherein the instructions further the processor to perform:
hashing the dll in response to the releasing a quarantine state that enable forcing of the failure based on the plurality of inspections not passing are associated with settings for at least one check contained in the remote access configuration file.

17. A system, comprising:
a processor that when executing instructions stored in a memory is configured to:
compare a first hash of a configuration file of a remote access client with a configuration file stored at a predefined web location using an executable file launched from a dynamic link library (dll);
compare a second hash of a local configuration file to the first hash in response to identifying that the first hash matches the configuration file stored at the predefined web location; and
release the remote access client from a quarantine state and establishing a connection between the remote access client and a remote access server in response to both identifying that the second hash matches the first hash based on the comparing and identifying that the remote access client has passed a plurality of inspections.

18. The system of claim 17, wherein the processor is further configured to one or more of:
update virus definitions;
validate that the virus definitions exist and are current;
determine if an installed antivirus program is active and runs on the remote access client;
inspect at least one operating system patch for a current version and timestamp; and
generate the hash of the remote access configuration file.

19. The system for providing protected remote access of claim 17, wherein the processor is further configured to:
download and replace the encrypted remote access configuration file in response to identifying that the second hash does not match the first hash based on the comparing.

20. The system for providing protected remote access of claim 17, wherein the processor is further configured to:
hash the dll in response to the releasing a quarantine state.

* * * * *